J. F. & R. E. McKINZIE & J. B. CLARK.
ELECTRIC MOTOR.
APPLICATION FILED MAY 3, 1911.

1,020,566.

Patented Mar. 19, 1912.
4 SHEETS—SHEET 1.

J. F. & R. E. McKINZIE & J. B. CLARK.
ELECTRIC MOTOR.
APPLICATION FILED MAY 3, 1911.

1,020,566.

Patented Mar. 19, 1912.

4 SHEETS—SHEET 2.

J. F. & R. E. McKINZIE & J. B. CLARK.
ELECTRIC MOTOR.
APPLICATION FILED MAY 3, 1911.

1,020,566.

Patented Mar. 19, 1912.

4 SHEETS—SHEET 4.

Witnesses:
T. H. Griswold.
E. P. Schlosser.

Inventors
James F. McKinzie
Robert E. McKinzie
John B. Clark
by Okel C. Billman Attorney

UNITED STATES PATENT OFFICE.

JAMES F. McKINZIE, ROBERT E. McKINZIE, AND JOHN B. CLARK, OF LA SALLE, ILLINOIS.

ELECTRIC MOTOR.

1,020,566.     Specification of Letters Patent.     Patented Mar. 19, 1912.

Application filed May 3, 1911. Serial No. 624,691.

*To all whom it may concern:*

Be it known that we, JAMES F. McKINZIE, ROBERT E. McKINZIE, and JOHN B. CLARK, citizens of the United States, residing at La Salle, in the county of Lasalle and State of Illinois, have invented certain new and useful Improvements in Electric Motors, of which the following is a specification.

Our invention relates to improvements in electric motors, the primary object of the invention being to provide a generally improved electro-dynamic machine of exceedingly simple, cheap, and efficient construction which may be readily and quickly regulated for either high or low speed or reversed as desired.

A further object of the invention is to eliminate the troubles often arising from the windings of the ordinary revolving armature by the provision of an armature adapted to be operated without the use of armature windings.

A further object of the invention is to improve the construction and arrangement of the commutator and to provide an improved mounting for the latter whereby the same may be readily rocked or shifted to reverse or regulate the speed of the motor.

With the above mentioned and other ends in view, the invention consists in the novel construction, arrangement, and combination of parts, hereinafter described, illustrated in one of its embodiments in the accompanying drawings, and particularly pointed out in the appended claims.

Figure 1:
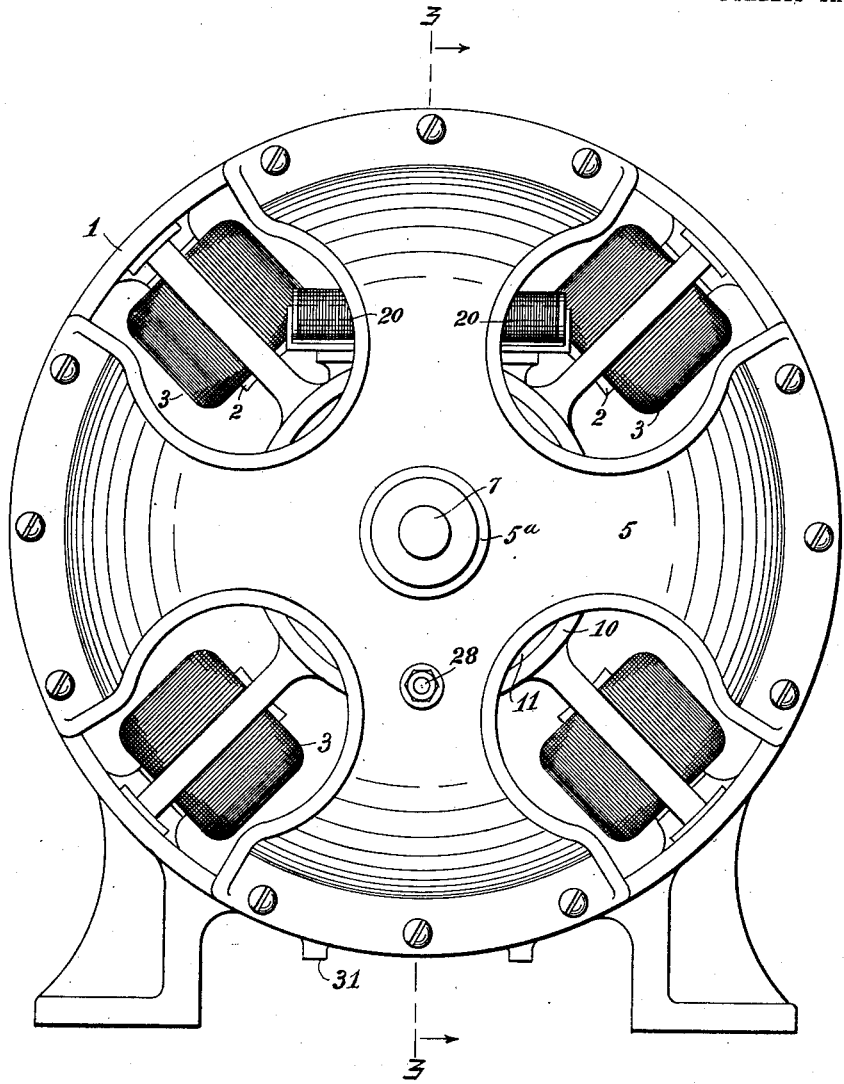
Figure 2:
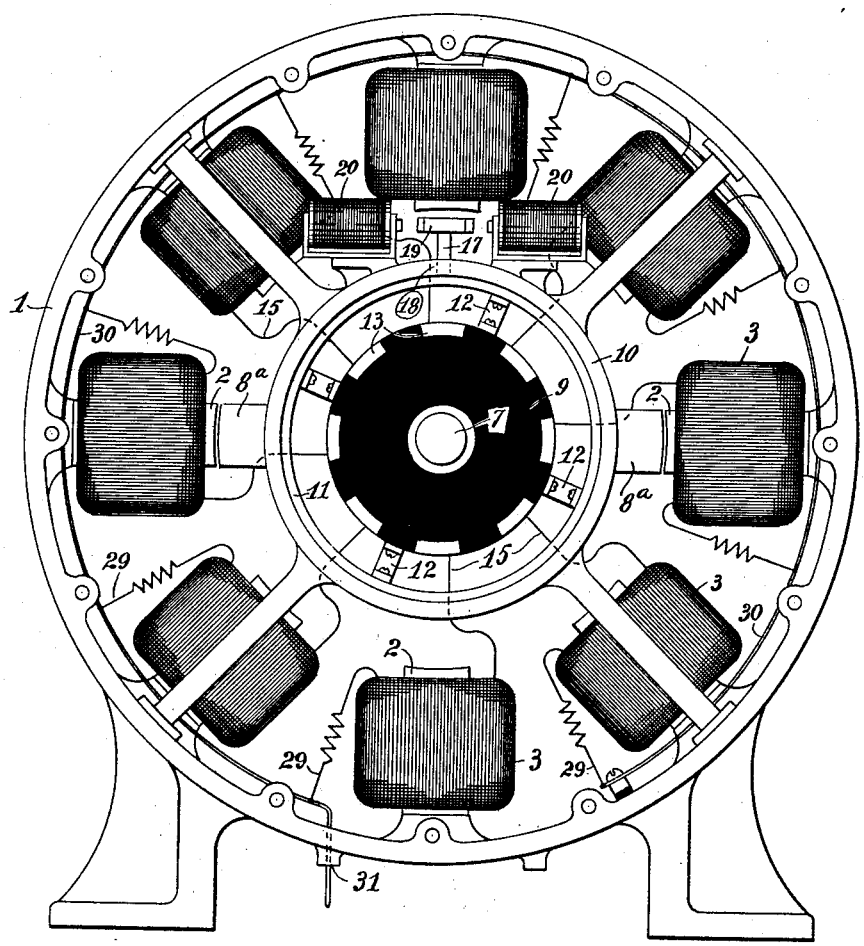
Figure 3:
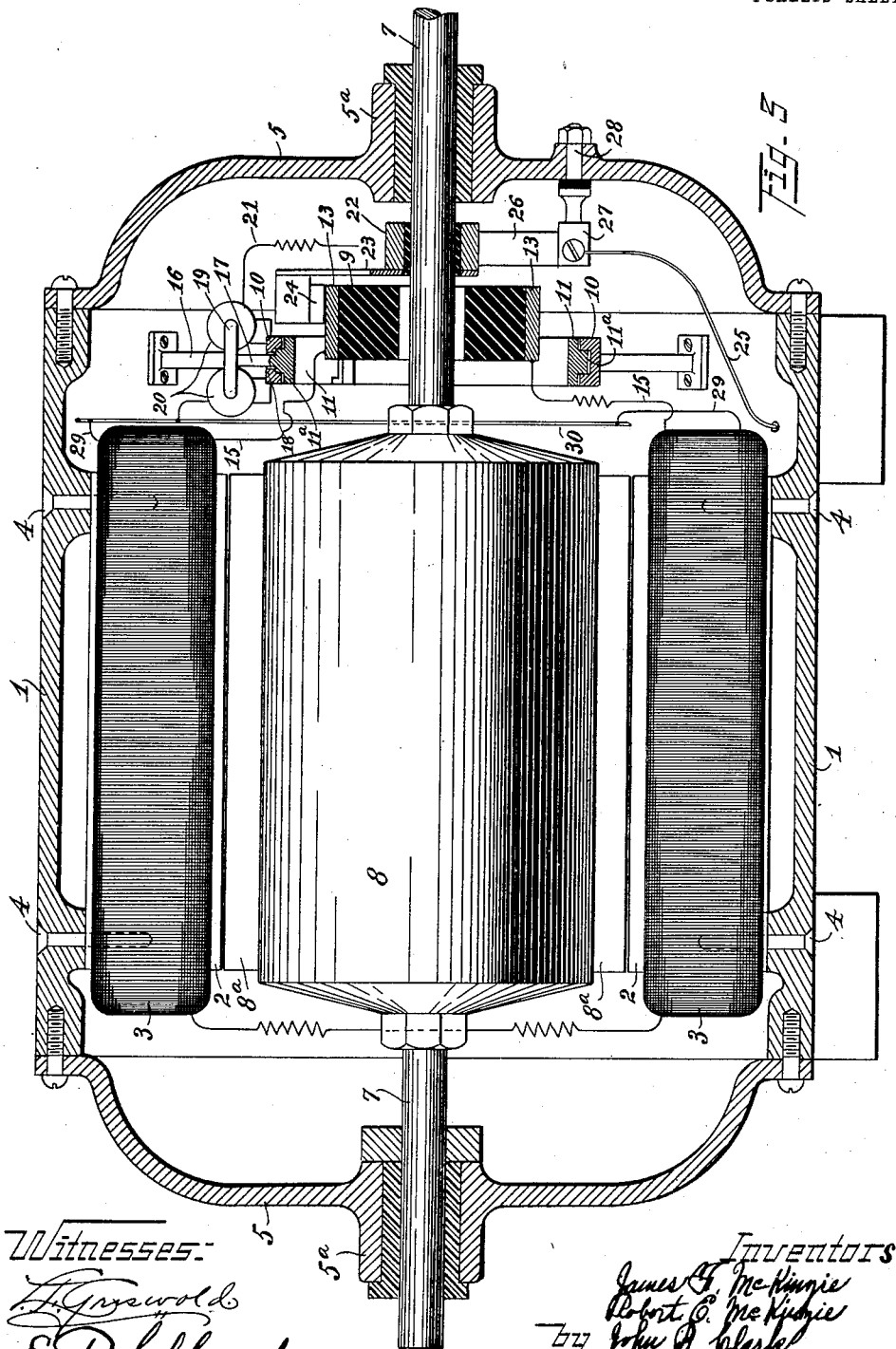
Figure 4:
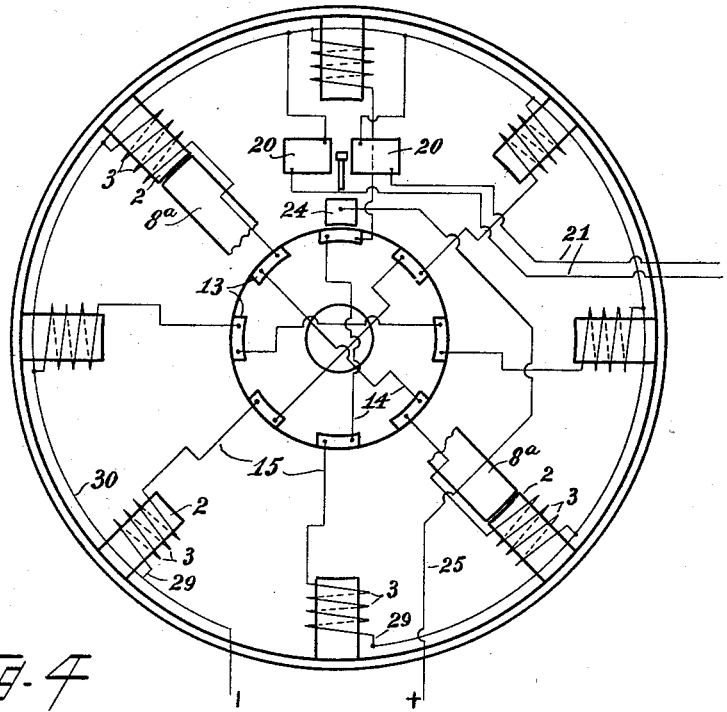
Figure 5:
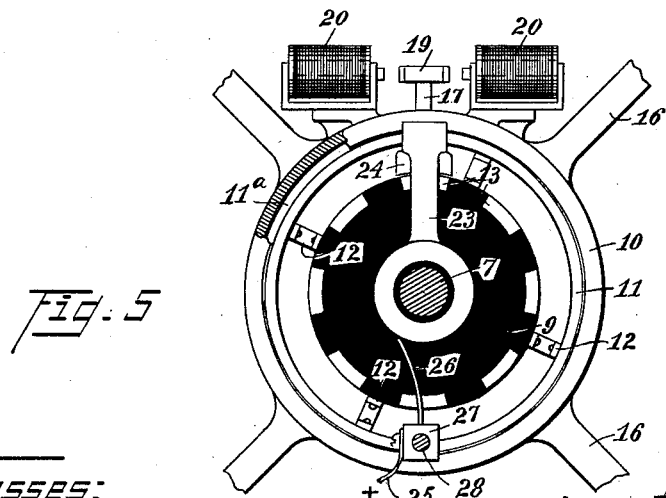

Referring to the drawings, forming a part of this specification, Figure 1, is an end elevation of the commutator end of the improved motor. Fig. 2, a similar view having the adjacent motor head removed, together with the current carrying ring and brushes for the purpose of clearer illustration of the parts. Fig. 3, a longitudinal sectional view taken through line 3—3 of Fig. 1. Fig. 4, a diagrammatic view showing the arrangement of the field magnets and windings and their connections with the commutator, together with the connections leading to the commutator moving or reversing magnets and the rotating brush. Fig. 5, an end view of the improved commutator and its mounting together with the reversing magnets used in connection therewith for shifting or rocking the commutator.

Similar numerals of reference designate like parts throughout all the figures of the drawings.

The improved motor comprises a motor casing 1, carrying a plurality of field magnets 2, surrounded by the usual energizing field walls 3.

The field magnets 2, are arranged in series about the inner periphery of the motor casing 1, and secured to the latter by means of securing bolts 4. The motor heads 5, are removably secured to the ends of the motor casing 1, by means of screw bolts 6, said heads 5, being provided with bearings 5ª, adapted to receive and carry the armature shaft 7. The armature shaft 7, is provided with a soft iron armature 8, provided with opposite armature poles 8ª.

The commutator comprises a commutator insulator 9, surrounding the armature shaft 7, and mounted in and supported by a brass supporting ring 10, through the medium of a commutator supporting ring 11, said ring 11, being secured to the commutator insulator by means of brackets 12.

The commutator comprises a plurality of commutator segments or bars 13, arranged about the periphery of the commutator insulator 9, and separated from each other, said segments being oppositely arranged and connected in pairs by means of jump wires 14 (see Fig. 4) and leading to correspondingly arranged field coils 3, by means of the lead or feed strands or connections 15.

The brass supporting ring 10, is supported and held in position by means of radially extending bracket arms 16, secured within the end of the motor casing 1, and the commutator supporting ring 11, is provided with a flanged portion 11ª, seated in a correspondingly grooved portion in the supporting ring 10, said commutator supporting ring being adapted to be rocked or rotated to increase or decrease the speed of the motor or reverse the same by means of an arm 17, extending through a slot or opening 18, in the supporting ring 10, said arm being provided with an armature bar 19, extending between a pair of reversing magnets 20, and being adapted to coöperate with and be operated by the latter.

The magnets 20, are connected to wires 21, (see Fig. 4) communicating with a suitable switch and source of electric energy and by means of said switch it is obvious that said magnets may be energized or deenergized whereby to correspondingly move the armature bar 19, thus rocking the commutator in the supporting ring 10, whereby to govern the direction of the rotation of the armature 8, and shaft 7.

A current carrying ring 22, is mounted on and insulated from the armature shaft 7, and is connected to a brush holder 23, said brush holder being carried by the shaft 7, and provided at its outer or free end with a brush 24, adapted to successively make contact with the commutator segments or bars 17, in successively magnetizing or energizing the field magnets 2, in proper sequential order whereby to keep the magnetic fields a proper distance ahead of the armature poles $8^a$, in a well-known and understood manner. The current is received through the wire 25, leading to a stationary brush 26, impinging upon the current carrying ring 2—2. The brush 26, is carried on an insulated bracket 27, secured in the adjacent motor head 5, by means of a bolt 28. The field coils 3, of the field magnets 2, are provided with lead wires 29, intersecting the ground wire 30, arranged within the periphery of the motor casing and leading therefrom through a suitable opening as shown. As the brush 24, is carried forward by the moving armature and armature shaft it will be seen that the field magnets 22, will be energized so as to always keep the magnetic fields ahead of the opposing poles $8^a$, of the armature, and it will be clearly understood that by adjusting or moving the commutator segments or bars 13, with respect to the brush 24, through any suitable connections or adjusting means with the arm 17, the speed of the armature may be increased or decreased as desired.

From the foregoing description, taken in connection with the accompanying drawings, the operation and advantages of our invention will be readily understood.

Having thus described an embodiment of our invention, what we claim and desire to secure by Letters Patent is,—

1. An electric motor, comprising a motor-casing carrying field magnets, a rocking commutator having oppositely arranged segments in circuit with the windings of diametrically opposite magnets, means for supporting said rocking commutator, a rotatable armature having diametrically opposite poles, a rotatable brush in contact with said commutator, a circuit carrying ring, and a stationary brush in contact with said ring.

2. In an electric motor, a plurality of field magnets, an armature having opposed poles, a rocking commutator having opposed segments in connection with the windings of opposed field magnets, and a rotatable brush adapted to make contact with said commutator segments whereby a current is successively introduced into opposed field magnets to establish the polarities thereof in advance of said armature poles, and means for rocking said commutator.

3. An electric motor, comprising a motor casing carrying a plurality of field magnets, a shaft carrying an armature having opposed poles, a rocking commutator having segments connected with the windings of said field magnets, a brush carried by said shaft and adapted to make contact with said segments whereby opposed field magnets are energized and deënergized in sequential order and the magnetic field maintained in advance of said armature poles, a stationary brush, and a current carrying ring in contact with said brushes.

4. An electric motor, comprising a motor casing carrying a plurality of field magnets, a rotatable shaft provided with an armature having opposed poles, a rocking commutator having segments electrically connected with said field magnets, a current carrying ring, a brush carried by said shaft in contact with said commutator segment, a stationary brush in contact with said ring, reversing magnets, and an armature on said commutator in coöperative relation to said reversing magnets whereby said commutator may be shifted to reverse the travel of said armature.

5. In an electric motor, a stationary supporting ring, a commutator supporting ring movably carried thereby, a commutator insulator carried by said last mentioned ring and provided with a plurality of spaced commutator segments, an armature shaft provided with a current carrying ring, a brush on said shaft adapted to make contact with said segments, and a stationary brush in contact with said current carrying ring.

In testimony whereof we have affixed our signatures in presence of two witnesses.

JAMES F. McKINZIE.
ROBT. E. McKINZIE.
JOHN B. CLARK.

Witnesses:
W. S. BECKER,
LOUIS E. HANSCHKE.